United States Patent [19]

Capurka et al.

[11] 4,051,827
[45] Oct. 4, 1977

[54] SELECTIVE THRESHOLD IGNITION CIRCUIT

[75] Inventors: Zbynek Antonin Capurka, Glen Ellyn; Ronald William Rumple, Schaumburg, both of Ill.

[73] Assignee: Motorola, Inc., Schaumburg, Ill.

[21] Appl. No.: 648,556

[22] Filed: Jan. 12, 1976

[51] Int. Cl.$^2$ ............................................. F02P 1/00
[52] U.S. Cl. ................................ 123/148 E; 361/253; 315/209 T; 307/327
[58] Field of Search ............ 123/148 E, 148 F, 148 S; 307/93, 310

[56] References Cited

U.S. PATENT DOCUMENTS

| 3,299,876 | 1/1967 | Mieras | 123/148 E |
| 3,861,370 | 1/1975 | Howard | 123/148 E |
| 3,933,141 | 1/1976 | Gunderson | 123/148 E |

Primary Examiner—Samuel Feinberg
Attorney, Agent, or Firm—James W. Gillman; Phillip H. Melamed

[57] ABSTRACT

A selective threshold ignition circuit adaptable for use in an electronic ignition system for an engine is disclosed. A magnetic pick-up produces an AC signal about a DC reference level which has a frequency related to the rotational movement produced by the engine. A circuit receives this AC signal and produces a corresponding spark timing signal by comparing the AC signal with a DC threshold level. A selector circuit chooses a first DC threshold level for the comparing circuit which is effectively equal to the DC reference level during the period of engine start up. The selector circuit chooses a second DC threshold level which is different from the DC reference level when the engine is running and before the engine has been started. By providing a threshold level equal to the DC reference level during the engine start up mode of operation, an accurate ignition timing signal is produced during this critical period. By providing a different threshold level during the other modes of engine operation, increased noise immunity is obtained during these other modes of operation which results in lessening the chance of noise transients causing a timing pulse which may result in an unwanted ignition spark.

16 Claims, 3 Drawing Figures

U.S. Patent
Oct. 4, 1977
4,051,827
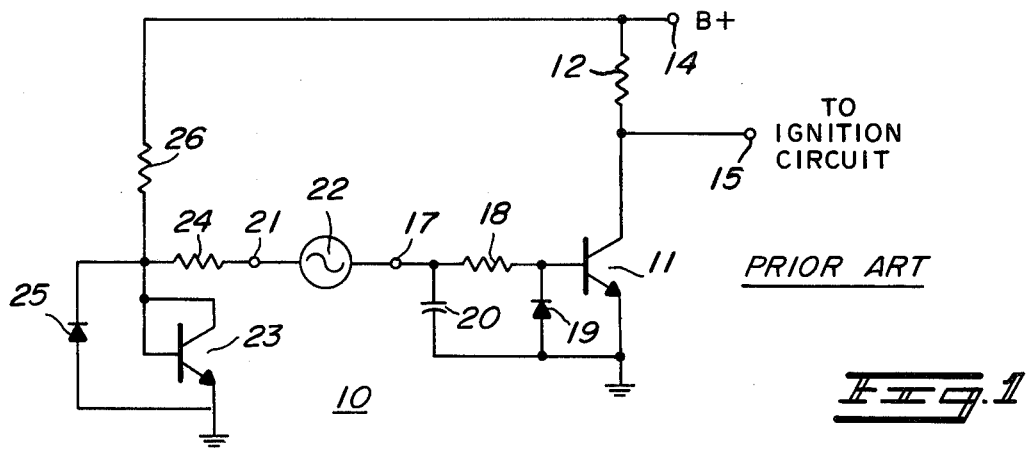
*Fig. 1* — PRIOR ART
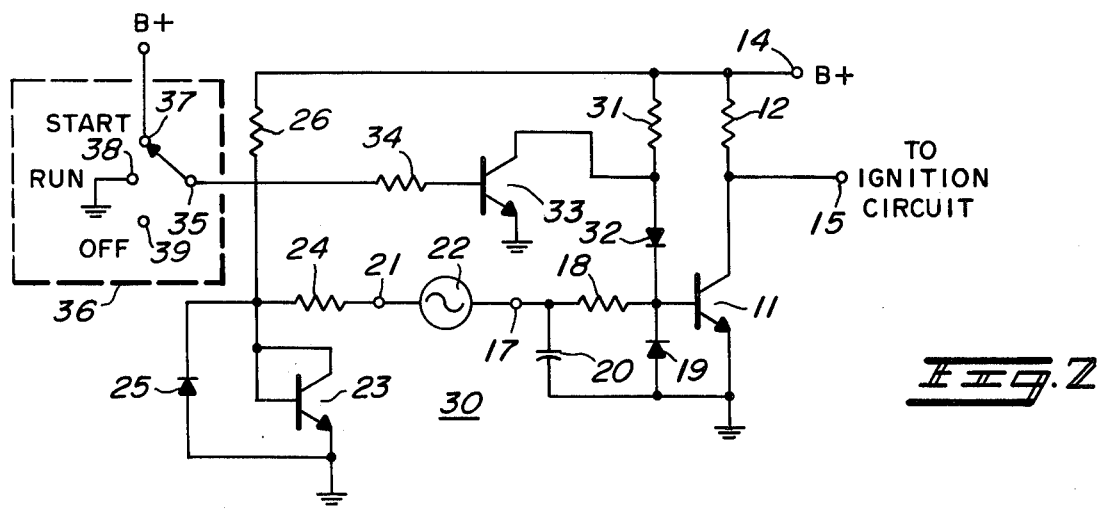
*Fig. 2*
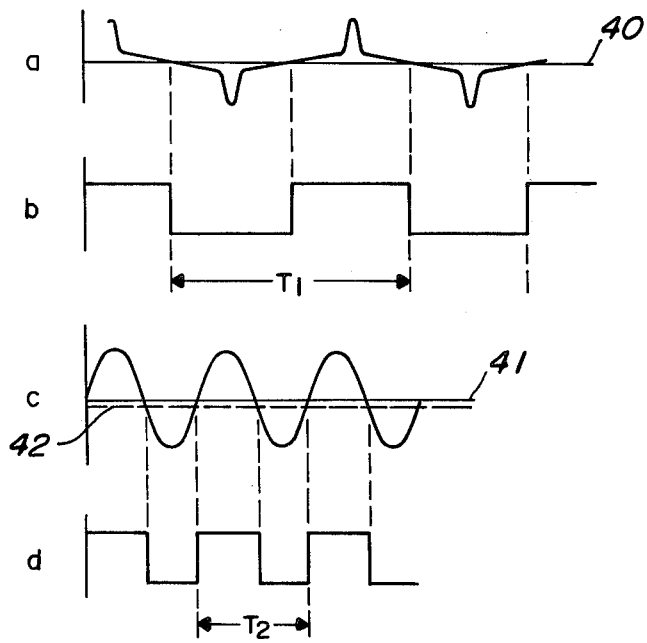
*Fig. 3*

SELECTIVE THRESHOLD IGNITION CIRCUIT

BACKGROUND OF THE INVENTION

The invention relates generally to the field of threshold logic circuits and more particularly to the field of threshold logic circuits used for producing spark timing signals for an electronic ignitition system.

In electronic ignition systems for internal combustion engines it is generally desirable to produce a spark ignition signal at the spark plugs of the engine at fixed times with respect to the rotation of the drive shaft being driven by the engine. Typically, a magnetic pick-up coil is used to produce an AC signal having a frequency related to the rotational movement produced by the engine. This AC signal is then conventionally used to render a transistor, or other type of semiconductor component, conductive during certain portions of the AC signal. Thus the transistor is used to create a logic timing signal from the received AC signal produced by the magnetic pick-up. This timing signal is subsequently used to produce spark plug ignitions at predetermined angular positions of the drive shaft which is being rotated by the engine. One such electronic ignition system is illustrated in U.S. Pat. No. 3,933,141 Ser. No. 449,185 by Philip Gunderson which is entitled "Zero Crossing Circuit For Electronic Ignition System" and which is assigned to the same assignee as the present invention.

Prior art ignition circuits typically use a threshold level (switching level) which is effectively substantially different than the DC reference level upon which the AC magnetic pick-up signal is superimposed. This results in increasing the noise immunity of the prior art circuits by requiring larger AC signal magnitudes in order to produce changes in the output of the threshold semiconductor device. However, this also results in a non-symmetric switching of the threshold device by the AC signal which in turn results in the generation of inaccurate spark timing signals, especially at the extremely low engine speeds encountered during the starting up of the engine.

One prior art ignition system which does provide for symmetric, zero crossing, switching is illustrated in the previously mentioned patent. This prior art system does provide accurate spark timing signals throughout all modes of operation of the engine. However, this prior art system does have a problem when used in a conventional ignition system since it is especially susceptible to small magnitude noise pulses induced in the magnetic pick-up coil. These pulses may cause an undesired switching of the threshold device which may result in the creation of an unwanted spark. In the engine run mode of operation, this additional unwanted spark may cause a cylinder to misfire and therefore inhibit the efficient operation of the engine. However, a much more serious problem is caused when such an unwanted spark is created before the engine has been started. In this case a noise pulse may create an undesired spark ignition which may ignite the fuel mixture in a cylinder. This in turn can result in a substantial cranking of the engine. The creation of a spark in the aforementioned circumstances could therefore result in either an undesired starting up of the engine or an undesired substantial rotation of the engine. Either of these consequences could be disastrous if an auto mechanic happens to be working upon the engine at the time of the creation of the undesired spark ignition.

The basic problem with the previously mentioned ignition system is caused by the fact that the threshold level of the switching device is effectively set to the DC reference level of the Ac signal created by the magnetic pick-up. Therefore any slightly positive or negative AC pick-up signal may trigger the switching device. While this condition creates the advantage of having symmetrical switching which results in accurate timing pulses throughout the operation of the engine, this effective equality of threshold and reference levels also creates the probability of the engine misfiring during high speed engine running conditions and prior to the desired start-up of the engine.

Some prior art ignition systems have provided for an internal hysteresis in the turning on of the threshold device. This amounts to requiring a higher threshold level for turning on the switching device and a different and lower threshold level for turning off the threshold device. These systems, just like systems which provide for a high (non-zero) and constant threshold level for the switching device, destroy all symmetrical switching and therefore prevent the development of accurate timing ignition pulses, especially at very low (cranking or starting) engine speeds.

SUMMARY OF THE INVENTION

It is therefore an object of the present invention to provide an improved threshold ignition circuit for overcoming the aforementioned deficiencies.

It is a more particular object of this invention to provide an improved threshold ignition circuit in which the threshold level of a switching device is selectively controlled.

It is a further object of the present invention to provide an ignition circuit in which accurate spark timing signals are generated during the starting up of an engine while substantially noise immune spark timing signals are generated during the running and prior to start-up modes of operation of the engine.

In one embodiment of the present invention there is provided a selective threshold ignition circuit adaptable for use in an electronic ignition system for an engine. The ignition circuit comprises: sensor apparatus for producing an AC signal about a DC reference level having a frequency related to the rotational movement produced by the engine; circuit apparatus, having a controllable predetermined DC threshold level, coupled to the sensor apparatus for receiving the AC signal and producing a corresponding spark timing signal by effectively comparing the received AC signal with the DC threshold level; selection apparatus coupled to the circuit apparatus for selecting at least a first and second DC threshold level for the circuit apparatus in response to corresponding first and second control signals being received by the selection apparatus; and apparatus coupled to the selection apparatus for producing the first and second control signals and supplying them to said selection apparatus whereby the spark timing signal is adaptable for use in developing ignition pulses for the engine and the noise immunity of the ignition circuit is increased for one of the first and second control signals.

Basically the present invention involves adding an additional amount of base bias current to a transistor threshold switching device which creates a spark timing logic signal from the AC signal created by a magnetic pick-up. This additional base bias current is provided only during the run mode of operation of the engine and prior to the start up of the engine. During the start up mode of operation, this additional base bias current is shunted to ground and the threshold level of the switching device is maintained substantially equal to the DC reference level about which the AC signal produced by the magnetic pick-up varies. This insures that during the start-up of the engine accurate ignition timing pulses are generated by the switching transistor.

BRIEF DESCRIPTION OF THE DRAWING

For a more complete understanding of the present invention reference should be made to the drawings, in which:

FIG. 1 is a schematic diagram of a prior art threshold ignition circuit;

FIG. 2 is schematic diagram of a selectively controlled threshold ignition circuit constructed according to the present invention; and FIGS. 3a-d are graphs which illustrate the waveforms created by the threshold ignition circuit illustrated in FIG. 2.

DESCRIPTION OF THE PREFERRED EMBODIMENT

FIG. 1 illustrates a prior art temperature and voltage supply compensated threshold ignition circuit which is shown in U.S. Pat. No. 3,933,141 previously referred to and hereby incorporated by reference into the present specification. The operation of the prior art circuit will first be described in general to provide a background for the present invention. Then the operation of the present invention, illustrated in FIG. 2, will be discussed with reference to the waveforms illustrated in FIG. 3. Identical reference numbers are used in FIGS. 1 and 2 to identify corresponding identical components.

FIG. 1 illustrates a threshold ignition circuit 10 which includes an NPN threshold switching transistor 11 having its emitter connected directly to ground. A resistor 12 is serially connected between the collector of the transistor 11 and a B+(power supply) terminal 14. The collector of the transistor 11 is directly coupled to an ignition circuit output terminal 15. The base of the transistor 11 is connected to a signal receiving terminal 17 through a resistor 18 and to ground through a diode 19 having its anode connected directly to ground. A capacitor 20 is provided between ground and the terminal 17. A terminal 21 is coupled to terminal 17 by a magnetic generator 22 which represents a magnetic pick-up coil that develops an AC signal having a frequency related to the rotational movement produced by an engine (not shown) for which the circuit 10 will provide ignition spark timing pulses for. An NPN transistor 23 has its emitter connected to ground and its base and collector connected to each other and coupled to the terminal 21 through a resistor 24. The base of transistor 23 is coupled to ground through a diode 25, having its anode directly connected to ground, and to the B+ terminal 14 through a resistor 26.

The precise operation of the prior art threshold ignition circuit 10 is described in detail in the previously mentioned U.S. Patent and therefore only a general discussion of the circuit operation will be presented here.

Basically, the magnetic pick-up 22 produces an AC signal at the terminal 17, this AC signal is coupled to the base of the transistor 11 and results in the periodic turning on and off of the switching transistor 11. In order for the switching transistor 11 to be turned on, a forward bias voltage must exist across the base emitter junction of this transistor. The resistor 26 and the diode connected transistor 23 provide a voltage which is compensated for temperature and voltage supply variations and which biases the transistor 11 such that the transistor will be turned on for any positive AC signal produced by the generator 22 at the terminal 17. Thus an AC signal which causes the voltage at the base of transistor 11 to exceed the DC voltage level thereat will turn on the transistor. Since the output of the magnetic generator (pick-up coil) 22 is maintained at the DC bias level present at terminal 17, any positive voltage produced by the pick-up coil, with respect to this DC level, will result in the turning on of the switching transistor 11. Likewise, any negative AC voltage created by the pick-up coil 22 will result in the turning off of the switching transistor 11. Thus a zero crossing switching circuit has been realized. The switching on and off of the threshold device 11 results in the creation of a pulse timing signal at the terminal 15 and this timing signal is used to create the spark timing ignition pulse which will ignite the spark plugs in the engine whose rotational movement is creating the AC voltage induced in the pick-up coil 22.

The circuit 10 has a single constant threshold level which is effectively set equal to the DC reference level about which the AC voltage induced in the pick-up coil 22 will vary. This results in symmetrical switching of the transistor 11 with respect to the waveform generated by the pick-up coil 22 and that in turn results in the creation of accurate timing pulses at the output terminal 15. The switching device 11 is contemplated as exhibiting no hysteresis, which means that the turn on and turn off levels of the device 11 are coincident. As mentioned previously, the ignition circuit 10 has a disadvantage in that very small positive noise signals induced in the magnetic pick-up coil 22 may create a logic pulse from the switching device 11 and this undesired logic pulse may result in the undesired ignition of one of the spark plugs of the engine.

FIG. 2 illustrates the present invention which overcomes the deficiences of the prior art circuit 10 illustrated in FIG. 1. FIG. 2 illustrates an improved threshold ignition system 30 which includes all of the components 11 through 26 which comprise the prior art threshold circuit 10 and which are identically numbered and connected. In addition, the threshold ignition circuit 30 includes a selectively activated bias circuit for the transistor 11 which includes a resistor 31 serially connected with a diode 32 between the B+ terminal 14 and the base of the transistor 11, with the cathode of the diode 32 directly connected to the base of the transistor. An NPN transistor 33 is provided and has its emitter connected directly to ground, its collector connected to the anode of the diode 32 and its base coupled by a resistor 34 to the center arm terminal 35 of a three position rotary ignition switch 36 (shown dashed) having a start terminal 37, which is maintained at B+ potential, a run-accessory terminal 38, which is maintained at a ground potential, and an off terminal 39. The ignition switch 36 is capable of connecting the center terminal 35 to any of the position terminals 37 through 39.

Typically, before starting the engine for which the ignition timing pulses are going to be supplied to, the ignition switch 36 connects the center terminal 35 to the run-accessory terminal 38. In this position, the transistor 33 is maintained in an off condition and the resistor 31 supplies a base bias current to the transistor 11 through the diode 32. This base bias current increases the base emitter voltage of the transistor 11 and therefore nominally turns on this transistor which results in requiring a larger negative voltage created by the pick-up coil 22 in order to turn this transistor off. If the pick-up coil 22 produces no AC voltage, the transistor 11 would therefore normally be biased in an on condition. Thus with the ignition terminal 35 coupled to ground, the threshold level of the transistor 11 is no longer effectively coincident with the DC reference level of the magnetic pick-up 22. In other words a significant AC voltage must exist at the terminal 17 in order to trigger the transistor 11. Thus substantial noise immunity is provided.

In order to start the engine, the ignition switch 36 is positioned such that the terminal 35 and 37 are connected to each other. In this position the transistor 33 is driven into saturation which results in effectively DC grounding the anode of the diode 32. This results in reverse biasing the diode 32 and preventing the resistor 31 from supplying any base bias current to the transistor 11. Thus the DC bias structure comprising the resistor 31 and the diode 32 is effectively removed by the saturating of the transistor 33. In this condition, no additional base bias is supplied to the transistor 11 by these components and the transistor 11 is biased solely by the collector emitter voltage of the diode connected transistor 23. This collector emitter voltage is adjusted by the resistor 26 such that the transistor 11 will have a threshold level by which the switching transistor 11 will respond to the zero crossings, the positive to negative variations of the AC voltage produced about the DC level existing at the terminal 17, which are created by the magnetic pick-up 22. Thus with the ignition switch position such that the center terminal 35 is connected to the start terminal 37, the ignition circuit 30 functions equivalently to the ignition circuit 10.

Typically, after the engine has been started, the ignition switch 36 is repositioned such that the terminals 35 and 38 are once again connected. This amounts to a reinsertion of the threshold level changing biasing network comprising the resistor 31 and the diode 32. In this position, once again the threshold level of the switching device 11 is altered to provide noise immunity.

FIG. 3a illustrates a typical AC voltage induced in the magnetic pick-up 22 when the engine is being started. The shape of the waveform is due primarily to the construction of the magnetic pick-up and the very slow engine speed at which the engine is being cranked. The waveform is illustrated as having a period of $T_1$.

FIG. 3b illustrates the digital logic output signal present at the terminal 15 in response to the generation of the waveform illustrated in FIG. 3a being generated by the magnetic pick-up 22 while the ignition switch 36 is in its start position. This waveform illustrates that the digital logic signal has switching states which correspond to the zero crossing points of the waveform illustrated in FIG. 3a about its DC reference level which is designated by the numeral 40. The use of a non-zero crossing threshold level for the switching device 11 would result in a large distortion of the digital logic signal produced in response to the waveform illustrated in FIG. 3a. Thus the circuit 30 has provided accurate spark timing signals during the critical start-up mode of operation of the engine.

The waveform in FIG. 3c illustrates the AC output of the magnetic pick-up 22 after the engine has been started and when the engine is in its running mode of operation. The waveform has a much greater rate of change at its zero crossing points and the period of the AC oscillations, designated by $T_2$, is much less than the cranking period $T_1$. The DC reference level of the AC signal is designated by the numeral 41 and the numeral 42 designates a lower DC threshold value which is created by the resistor 31 and diode 32 when the ignition switch 36 is in its run position.

The waveform illustrated in FIG. 3d is the timing output signal present at the terminal 15 in response to the production of the waveform illustrated in FIG. 3c with the ignition switch in its run position. The effective non-coincidence of the threshold level 42 and the DC reference level 41 has not created any substantial change in the timing signal produced by the ignition circuit 30 since the rate of change of the signal in FIG. 3c is much larger at its zero crossing points than the rate of change of the signal illustrated in FIG. 3a. Thus again an accurate timing signal is produced by the ignition circuit 30, but in this case additional noise immunity is provided by the effective non-coincidence of the threshold logic level 42 and the DC reference level 41. Therefore any noise pulse picked up by the magnetic coil 22 must induce a voltage which negatively exceeds the DC level 42 in order to trigger the transistor 11. Thus substantial noise immunity has been provided for the circuit 30 when the switch 36 is in the run position.

While the foregoing analysis of the operation of the circuits 10 and 30 has been explained with reference to voltage levels, an equivalent analysis holds true if the magnetic coil 22 is considered to induce current pulses into the base of the transistor 11 through the resistor 18. Thus whether the threshold level is considered to be a voltage threshold or a current threshold the operation of the circuit remains the same.

Therefore the present invention has provided a selective threshold ignition circuit in which accurate digital ignition timing pulses are created during the starting of an engine by having the threshold level of a switching device effectively coincident with the DC reference level of a magnetic pick-up. During the run and accessory mode of operation of the engine the threshold level of the switching device is set to a different level from the DC reference level of the magnetic pick-up coil. This provides a substantial noise immunity for the ignition circuit while still providing an accurate spark timing signal during the engine running mode of operation. In addition, noise immunity is provided prior to the start up of the engine by setting the threshold level of the switching device to a different level than the DC reference level of the magnetic pick-up coil.

While I have shown and described specific embodiments of this invention, further modifications and improvements will occur to those skilled in the art. All such modifications which retain the basic underlining principles disclosed and claimed herein are within the scope of this invention.

I claim:

1. A selective threshold ignition circuit adaptable for use in an electronic ignition system of an engine, said circuit comprising:

sensor means for producing an AC electrical signal about a predetermined DC electrical reference level, said AC signal being created in response to and having a frequency related to the rotational movement produced by an engine;

switching circuit means, having a predetermined DC threshold level, coupled to said sensor means for receiving said AC signal varying about said DC reference level and producing a corresponding spark timing signal by effectively comparing said received AC signal varying about said DC reference level with said DC threshold level and switching when said received AC signal varying about said DC reference level varies, with respect to said threshold level, from above to below said threshold level and from below to above said threshold level;

selection means coupled to at least one of said sensor means and said circuit means for selecting at least first and second modes of operation for the combination of said sensor means and said switching circuit means in response to corresponding first and second control signals being received by said selection means, in said first mode of operation said DC reference level being substantially equal to said DC threshold value, in said second mode of operation said DC reference level being effectively different from said DC threshold level; and means coupled to said selection means for producing said first and second control signals and supplying them to said selection means; whereby said spark timing signal is adaptable for use in developing ignition pulses for the engine and the noise immunity of said ignition circuit is increased for one of said first and second control signals without substantially affecting the accuracy of the spark timing signal while a more accurate spark timing signal is obtained for the other one of said first and second control signals.

2. A selective threshold ignition circuit according to claim 1 wherein said control signal producing means comprises a switch having at least first and second positions corresponding to said first and second control signals.

3. A selective threshold ignition circuit according to claim 2 wherein said switch is an engine ignition switch with said first position corresponding to an engine start-up position of the ignition switch and said second position corresponding to an engine run position of the ignition switch.

4. A selective threshold ignition circuit according to claim 3 wherein said sensor means comprises a magnetic pick-up coil having voltages induced therein by the rotational movement produced by the engine.

5. A selective threshold ignition circuit according to claim 4 wherein said ignition switch is a rotary position switch.

6. A selective threshold ignition circuit according to claim 1 wherein said control signal producing means includes apparatus for producing said first control signal in response to the starting up mode of the engine and producing said second control signal after the engine has been started and is running.

7. A selective threshold ignition circuit according to claim 6 wherein said sensor means comprises a magnetic pick-up coil having voltages induced therein by the rotational movement produced by the engine.

8. A selective threshold ignition circuit according to claim 1 wherein said control signal producing means includes apparatus for producing said first control signal in response to the starting up mode of the engine and producing said second control signal before the engine has been started.

9. A selective threshold ignition circuit according to claim 8 wherein said sensor means comprises a magnetic pick-up coil having voltages induced therein by the rotational movement produced by the engine.

10. A selective threshold ignition circuit according to claim 8 wherein said control signal producing means includes apparatus for producing said second control signal after said engine has been started and is running.

11. A selective threshold ignition circuit according to claim 10 wherein said sensor means comprises a magnetic pick-up coil having voltages induced therein by the rotational movement produced by the engine.

12. A selective threshold ignition circuit according to claim 9 wherein said switching circuit means comprises a first transistor with a threshold level and wherein said sensor means includes a biasing circuit for said first transistor, said biasing circuit comprising a second transistor having its base circuit comprising a second transistor having its base connected to its collector; the base emitter junction of said first transistor being coupled across the collector and emitter terminals of said second transistor, and said magnetic pick-up coil being coupled between the collector of said second transistor and the base of said first transistor, whereby said second transistor effectively temperature compensates said DC reference level for the threshold level of said first transistor.

13. A selective threshold ignition circuit according to claim 12 wherein said selection means includes a resistor coupled between a source of potential and the base of said first transistor, said resistor selectively capable of supplying base bias current to said first transistor and thereby changing at least one of said reference and threshold levels.

14. A selective threshold ignition circuit according to claim 13 wherein said selection means comprises a switching device for alternately preventing and permitting said resistor to supply base current to said first transistor in response to said first and second control signals.

15. A selective threshold ignition circuit according to claim 14 wherein said switching device comprises a third transistor having its base adaptable for receiving said controls signals and having its collector coupled to said resistor.

16. A selective threshold ignition circuit according to claim 15 which includes a diode coupled between the base of said first transistor and said resistor, said diode also being coupled between the collector of said third transistor and the base of said first transistor, whereby said diode prevents the third transistor from disturbing the bias provided by the second transistor while said third transistor is preventing said resistor from supplying bias current to said first transistor.

* * * * *